Oct. 21, 1952  J. H. CARBONE  2,614,423
FLUID FLOW ORIFICE STRUCTURE
Filed Oct. 7, 1947  3 Sheets-Sheet 1
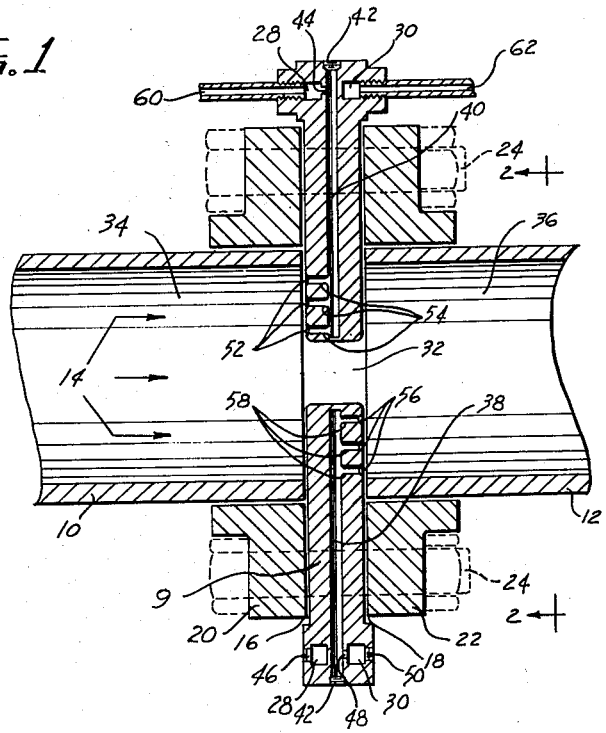
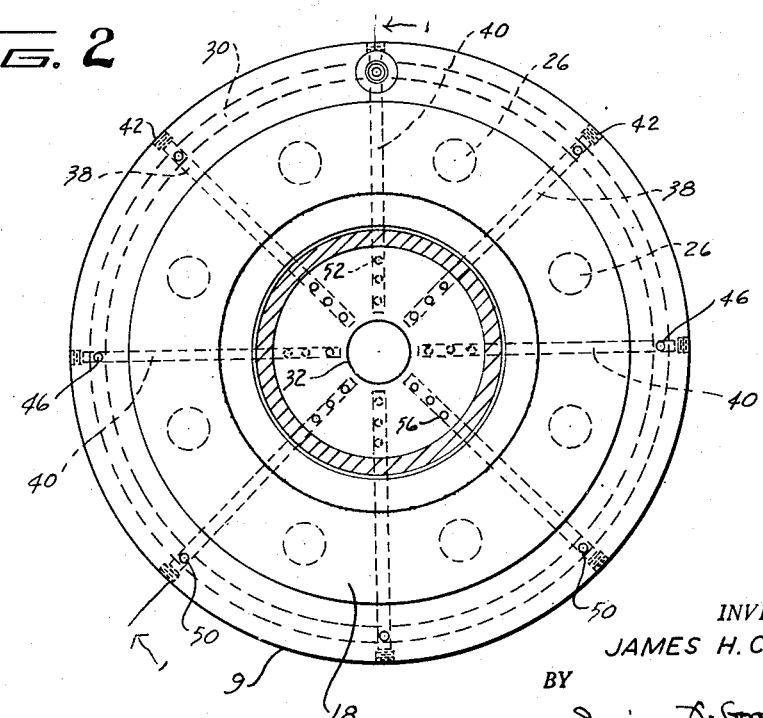
INVENTOR.
JAMES H. CARBONE
BY Irving J. Goodfriend
ATTORNEY Oct. 21, 1952
J. H. CARBONE
2,614,423
FLUID FLOW ORIFICE STRUCTURE
Filed Oct. 7, 1947
3 Sheets-Sheet 2
FIG. 3
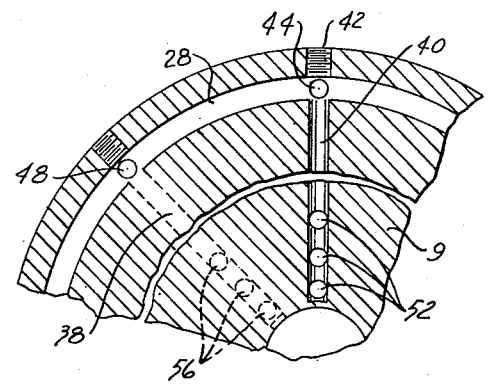
FIG. 5
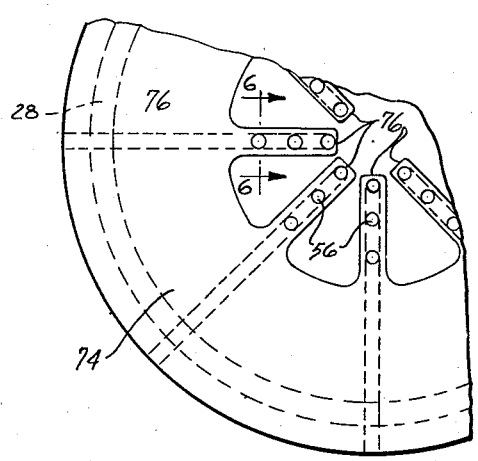
FIG. 4
FIG. 6
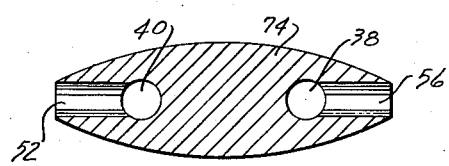
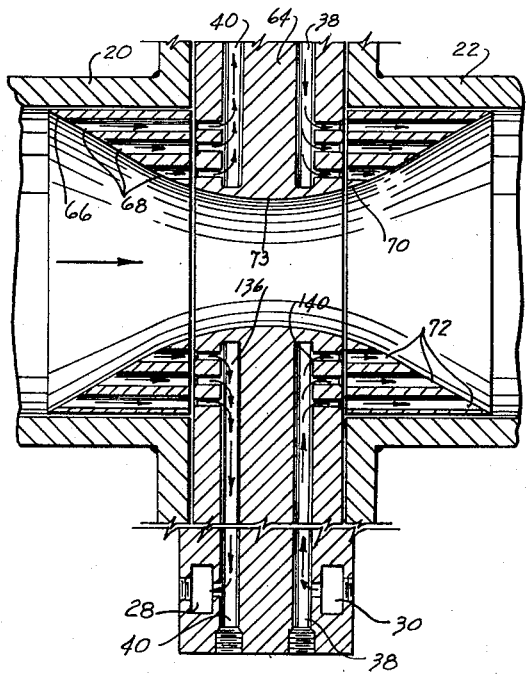
INVENTOR.
JAMES H. CARBONE
BY
Irving P. Goodfriend
ATTORNEY Oct. 21, 1952     J. H. CARBONE     2,614,423
FLUID FLOW ORIFICE STRUCTURE
Filed Oct. 7, 1947     3 Sheets-Sheet 3
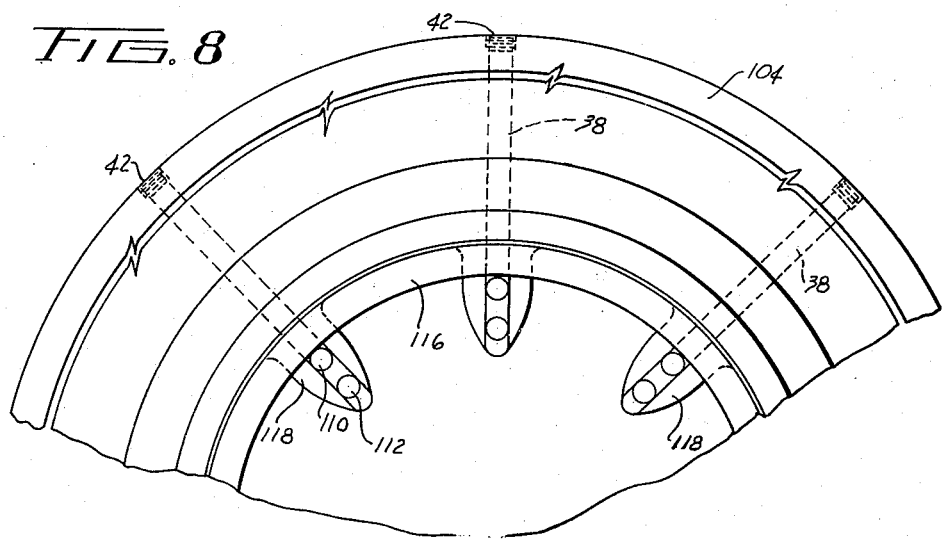
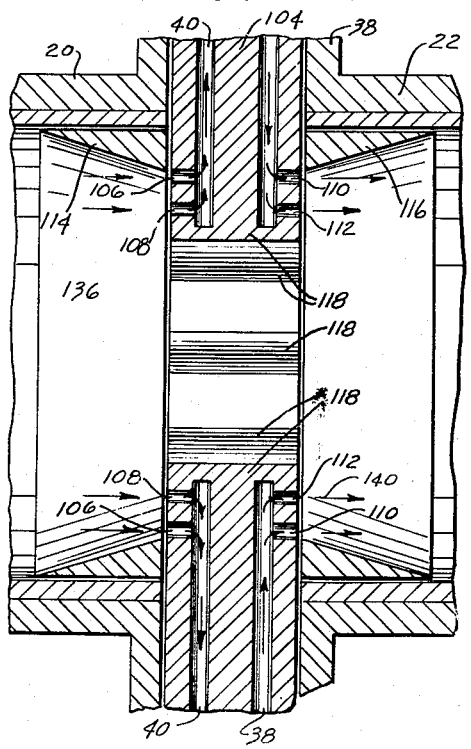
INVENTOR.
JAMES H. CARBONE
BY Irving J. Goodfriend
ATTORNEY Patented Oct. 21, 1952

2,614,423

UNITED STATES PATENT OFFICE 2,614,423

FLUID FLOW ORIFICE STRUCTURE

James H. Carbone, Baldwin, N. Y.

Application October 7, 1947, Serial No. 778,367

9 Claims. (Cl. 73—211)

The present invention relates to a means for measuring the quantity of fluid flowing through a conduit and more particularly to a device that may be arranged in the conduit across the cross sectional area thereof and by means of which the mean total differential between the impact pressure and static pressure is utilized to actuate a measuring and recording metering mechanism.

Heretofore, where it was desired to determine the quantity of fluid, such as water, oil, steam, air, gas, etc., passing a selected point in a conduit pipe or duct, orifice meters or Venturi meters were used. Such meters determined the velocity of flow by measuring the static pressure differential of the flow across the orifice at selected points in a given length or run of straight pipe.

These prior meters required that their accuracy be checked and calibrated by a Pitot tube, and in addition employed a single nozzle or a series of nozzles in the wall of the pipe or in one longitudinal axial flow plane closely adjacent the internal wall surface of the pipe to ascertain the pressure difference across the orifice or nozzle.

Thus, in all such devices, it was necessary to use pressure taps in the wall of the pipe around its circumference, both upstream and downstream. In order to avoid eddying and turbulence, in the case of orifice meters, such pressure taps were arranged away from the section of minimum contraction of flow of the fluid, and in the case of Venturi meters, such taps were arranged in the wall of the pipe on the upstream side and in the throat section of the Venturi. As a matter of fact, the position of the pressure taps is always given as a percentage of the pipe diameter at the upstream or downstream point.

The present invention therefore contemplates the provision for a primary head meter of a thick plate orifice structure in which the pressure taps are arranged and which communicate with a chamber or head formed in the structure itself, thereby enabling the plate structure, as a unit, to be mounted in the conduit or pipe across the section thereof. Thus, the necessity of tapping the pipe or conduit itself is eliminated. Therefore, with the present device, an instantaneous mean total pressure differential may be obtained across the sectional area of flow of the fluid with the accuracy heretofore obtained with Pitot tubes.

Heretofore, it has been recognized that the velocity of a fluid flowing through a pipe or conduit varies at different points of the pipe or conduit section. It was necessary, therefore, to manually traverse the area of the pipe or conduit and obtain a number of readings at different points with a Pitot tube, the position of which points of reading were difficult to repeat. By determining the average of the pressure differentials, that is, between the impact pressure and static pressure produced by the flow of the fluid, the mean velocity of flow of the fluid in the pipe was ascertained.

The present invention therefore contemplates the provision of a device by means of which there is obtained spontaneously and directly an average reading of the pressure differential of a plurality of reading points selected across the section of the pipe or conduit so that the flow of the fluid through the pipe is measured and a continuous record thereof may be made, a result not heretofore possible of accomplishment and which is extremely accurate since the reading points are always relatively fixed in the meter as an integral part thereof.

The present invention contemplates the provision of an orifice plate structure which utilizes the principle of the Pitot tube to ascertain the velocity pressure of the fluid flowing through a known cross sectional area of the conduit pipe or duct. Such velocity pressure is the difference between the impact or total pressure on an orifice opposite to the direction of flow of the fluid, sometimes called the upstream side, and the static pressure or suction on an orifice facing a direction opposite the direction of flow of the fluid, sometimes called the downstream direction. The orifice plate structure according to my invention is provided with a plurality of means for determining such pressure differential at selected points in the cross sectional area of the conduit pipe or duct which selected points are spaced about selected circumferences in the pipe and along spaced radii or diameters across the pipe.

The structure of the present invention is symmetrical with respect to both the longitudinal and vertical axes thereof, and therefore may be used to obtain the pressure differential of the flow in either direction without requiring any change or modification after the initial installation of the structure. The structure does not require that there be any upstream or downstream provisions in installation as is required with other types of meters; nor does it require that a certain length of straight pipe be provided on either or both sides of the meter for accurate reading of the pressure differential.

The orifice plate structure of the present invention is constructed and arranged so that the pressure differential at each of this series of points so spaced across the cross sectional area of the conduit pipe or duct is spontaneously averaged so that the mean or average velocity pressure at any given period of time is determined so that a continuous record of the quantity of the fluid flowing therethrough may be made.

In the prior art, it has been determined that the walls of the conduit, pipe or duct present frictional resistance to the flow therepast of the fluid and therefore an unreliable pressure differential was obtained where a Pitot tube reading was had close to the inner wall. It was found that the average velocity of the fluid corresponded to the velocity found at a given distance from the center of the conduit or pipe. This distance has been found to be .71r and .75r, where r is the radius of the cross sectional area and where the distance is measured from the center toward the internal wall surface. My invention contemplates the use of a plate structure which has fixed orifices at these two points whereby an instantaneous reading of the mean velocity pressures may be readily obtained and which does not require care and measurement to determine the position of these critical points since they are fixed in the structure. This has not heretofore been possible of accomplishment by any known device.

The present invention contemplates the provision of a compact orifice plate structure constructed and arranged to be mounted between two flanges of a pipe joint, which is drilled and faced off to correspond to and is gasketed in the conventional manner on both sides of the orifice plate to form a single tight pipe joint. The orifice plate structure is preferably larger than the flanges and is provided with an orifice diameter which varies from that of the conduit pipe or duct to any smaller size or orifice by which a variable differential pressure may be obtained across the orifice plate.

The present invention further contemplates such an orifice plate structure which is provided with a plurality of impact and static pressure ports or openings, which ports or openings are spaced in circumferential series around the plate and in radial series across the plate and which ports or openings communicate with pressure rings or chambers adjacent to the outer edges of the orifice plate which pressure rings or chambers are connected to a measuring and recording mechanism.

The objects, uses and advantages of the present invention will be clear from the following description and the drawings appended thereto, in which Fig. 1 is a section through an orifice plate structure according to my invention through the line 1—1 of Fig. 2 and mounted between the flanges of a pipe joint.

Fig. 2 is a front view of the said orifice plate structure.

Fig. 3 is a partial cross section showing the annular pressure ring or chamber thereof.

Fig. 4 is a sectional view of a modification of my orifice plate structure.

Fig. 5 is a partial plan view of a further modification of a structure according to my invention.

Fig. 6 is a section on the line 6—6 of Fig. 5.

Fig. 7 is a section through a pipe broken away to condense the drawing, showing a further modification of my invention mounted therein.

Fig. 8 is a partial front view thereof.

In the drawings, like reference characters refer to similar elements throughout the various figures.

Referring now to the drawings and particularly to Figs. 1, 2 and 3, an orifice plate structure 9 in one form of my invention is mounted between the sections 10 and 12 of a conduit, pipe or duct through which a fluid is flowing in the direction of the arrows 14. The faces 16 and 18 of the orifice plate structure, which is preferably circular in shape and made of any suitable metal, are recessed so that the structure may be held between the conventional standard pipe flanges 20 and 22 which thus may fit against them.

The pipe flanges 20 and 22 are tightened and held against the structure by means of conventional nuts and bolts 24 which are received in the spaced openings 26 drilled in the structure around its circumference between the center of the structure and the circumferentially disposed annular pressure channels or chambers 28 and 30, to which further reference will be made.

The center of the plate structure is bored to permit the fluid to flow through the orifice space 32 from the upstream side 34 of the meter to the downstream side 36 thereof.

Disposed radially around the structure and extending from the outside of the structure to the orifice space 32, I provide the communicating passages 38 and 40. These passages are closed at the inner ends thereof adjacent the orifice space 32 and are tapped at their outer ends to receive the plugs 42 which shut off the outer ends of the channels.

The communicating passages 38, as will be described, are arranged to determine the impact pressure on the upstream side 34 of the structure and alternate about the structure with the communicating passages 40, which, as will be described, are utilized to ascertain the static pressure on the downstream side 36 of the structure.

The orifice plate structure is drilled at 44 from the face 16 so that the annular channel or chamber 28 communicates with each communicating passage 40. In order to close off this communication, the outer opening thereof is tapped to receive therein a shut-off plug 46.

Similarly, the structure is drilled at 48 so that the annular channel or chamber 30 communicates with each communicating passage 38 and is tapped to receive the shut-off plug 50.

While I have shown four communicating passages 38 and join alternating communicating passages 40, it will of course be understood that any greater or lesser number of such passages may be provided.

In order to obtain the impact pressure, I drill that portion of my orifice plate structure which is positioned inside of the conduit pipe or duct to form the ports 52, facing the upstream side 34, and which ports through the channels 54 communicate with a passage 40.

The ports 52 form a series of concentric rings around the center of the plate structure and the orifice space 32. The center of each ring formed by a series of ports is each common with the center of the orifice 32. These concentric circles, in turn, are also the center lines of a series of concentric annular rings of equal area or zones, which together make up the full internal area of cross section of the conduit or pipe 10.

Similarly, the ports 56 are drilled to face downstream and communicate with the passages 38 by means of the connecting channels 58. These ports 56 are utilized to ascertain the static pressure and are equal in number to the number of ports 52 and likewise form concentric rings of equal areas and located at equal radial distances from the center of my structure.

Thus it will be noted that the equivalent of 12 Pitot tube impact pressure and static pressure readings may be obtained by the modification illustrated and a traverse of the area through which the fluid flows is accurately obtained, which will always be the same and which does not require drilling the conduit pipe or duct to insert a Pitot tube, the positions of which heretofore were always manually determined but which by the use of my structure are always fixed at the same positions.

It will of course be understood that the number of ports may be varied and their position changed, the greater the number of ports used resulting in a greater accuracy.

The impact pressure channel or chamber 28 is connected by means of the tube 60 to one side of a conventional metering or recording mechanism (which need not be illustrated since it forms no part of the invention) to the other side of which mechanism the static pressure channel or chamber 30 is also connected by means of the tube 62.

It will now be recognized that a traverse of the cross section of the pipe is spontaneously made to communicate the average impact pressure of the fluid flowing to the metering or recording apparatus and concurrently the average static pressure corresponding thereto is spontaneously communicated to this apparatus so that a continuous reading of the fluid flow is relatively accurately made by a unitary device that can be mounted at any position in a pipe without in any way affecting the pipe itself.

It will be understood that the embodiment illustrated in Figs. 1–3 may in some cases present a resistance to flow because the central opening 32 is but slightly bevelled. In order to reduce the resistance to flow of my plate structure, an embodiment such as that illustrated in Fig. 4 may be utilized.

Referring to Fig. 4, I insert against the orifice plate structure 64 on the upstream side 32, the ring 66 which is tapered to form a contracting throat at the inlet to the plate structure. The ring 66 is provided with the passages 68 each of which communicates with a corresponding upstream facing port 52.

On the downstream side 36, I insert against the orifice plate structure 64 the ring 70 which is tapered to form an expanding throat. The ring 70 is provided with the passages 72 each of which communicates with a corresponding downstream facing port 56.

The orifice space 32 of the orifice plate structure 64 is preferably curved at 73 so that in cross section the throats of the ring 66 and 70 form with the orifice plate meter 64 a Venturi shape which lessens the resistance to flow of the fluid that may be imposed by my orifice plate meter.

The taper of the ring 66 may be made equal to that of the ring 70 where it is desired to provide for reversibility of flow.

The number of ports 52 and 56 may also be increased to twice the number found in the embodiment of Figs. 1 to 3 by increasing the width of the orifice plate structure so that there are the same number of communicating passages 38 and 40. In the modification of Fig. 4, there is a passage 40 corresponding to a passage 38 in the rear thereof and a port 52 facing upstream and a corresponding port 56 facing downstream on the other side thereof. Thus, in a modification corresponding to that of Figs. 1–3, twenty-four ports for the impact pressure reading are provided and twenty-four ports for the static pressure are provided each at the same radial distance and equivalently spaced around the meter.

Referring now to Figs. 5 and 6, I have there illustrated a modification in which the plate 74 is cut out between those portions in which the communicating passages 38 and 40 are provided. Thus, the elements 76 in which the ports 52 and 56 are arranged to extend into the flow area of the conduit type or duct but the plate structure terminates at or near the internal wall of the pipe conduit or duct.

Each element 76 is provided with a plurality of ports, one series of which faces downstream and the other series of which faces upstream and each of which series of ports form concentric rings thereof about the center of the orifice plate meter and each of which concentric series of ports lies in an equal cross sectional area of the pipe at a selected radius.

Thus, the same accurate traverse of the cross sectional pipe area is spontaneously obtained with a lessening of resistance to flow of the fluid, it being understood that each passage 38 and 40 communicates with a pressure ring or chamber 28 and 30, which in turn is connected to the corresponding side of a metering and recording apparatus.

Referring now to Figs. 7 and 8, I have there illustrated a modification 104 of my orifice plate structure in which two impact pressure ports or openings 106 and 108, facing upstream, are arranged therein in the series thereof on circumferences, the radii of which are respectively .75 of the radius of the pipe in which the structure is mounted and .71 of that radius. Thus, each series of impact ports is arranged at those positions where it has been found that the mean impact pressure may be measured.

The ports 106 and 108 are connected to the passageways 40 each of which communicates with an annular pressure channel such as 28, which is connected to the impact pressure side of a metering and recording apparatus as by a pipe 60.

The orifice plate structure 104 is provided with passages 38 each of which connect with static pressure ports or openings 110 and 112, which are similarly positioned around the flow area to correspond to the positions of the ports or openings 106 and 108 and which ports or openings 110 and 112 face downstream.

On the upstream side in the pipe flow area, I prefer to provide the tapered ring 114 which forms a contracting throat directing the flow of the fluid toward the ports or openings 106 and 108 and on the downstream side, I prefer to provide the tapered ring 116 which forms an expanding throat directing the flow of the fluid away from the ports or openings 110 and 112 to thus streamline the flow of the fluid toward and away from the ports or openings.

Although the rings 114 and 116 are shown in Figs. 8 and 9 as separate members, it will be understood that they may be made integral with the orifice plate structure 104.

I prefer to cut out the elements 118 in which the ports or openings 106 and 108 and the ports or openings 110 and 112 are drilled to reduce somewhat any frictional resistance to the flow of the fluid through my structure.

While I have shown and described certain specific embodiments of my invention, it will be understood that these are illustrative only, since other modifications within the spirit and scope of the invention will now be apparent to those skilled in the art.

Hence I do not intend to be limited to the details shown but intend to claim my invention as limited only by the scope of the appended claims.

I claim:

1. In a fluid flow orifice structure for arrangement in a conduit to measure the flow of fluid therein, a plate for insertion in the conduit across the flow area through which the fluid in the conduit passes, said plate having a central opening through which the fluid passes and a plurality of passages radially arranged about the center of the plate at spaced intervals, said plate having ports for measuring the impact pressure of the fluid flowing through the conduit, said impact pressure ports positioned in radial series one above the other in the flow area between the center of the said plate and the periphery thereof, said impact pressure ports assuming circumferentially spaced circular series of ports around the center of the said plate, each radial series of ports communicating with a radially disposed passage, said plate at the periphery thereof having an annular impact pressure channel, each radially disposed passage communicating with the annular impact pressure channel, said plate having a plurality of second passages radially arranged about the center of the plate at spaced intervals and equal in number to the number of first mentioned radially arranged passages, said plate having second ports for measuring the static pressure of the fluid flowing through the conduit and equal in number to the number of the impact pressure ports, said static pressure ports positioned in radial series one above the other in the flow area between the center of the said plate and the periphery thereof, said static pressure ports assuming spaced circular series of ports around the center of the said plate, each circular series of static pressure ports having a diameter equal to the diameter of a corresponding circular series of impact pressure ports, each radial series of second mentioned ports communicating with a radially disposed second mentioned passage, said plate having an annular static pressure channel, each radially disposed second mentioned passage communicating with the annular static pressure channel, said impact pressure ports and said static pressure ports being open on opposite sides of the plate, respectively, means for connecting the annular impact pressure channel to one side of a metering mechanism and second means for connecting the static pressure channel to the other side of the said metering mechanism.

2. In a fluid flow meter to be arranged in the flow area of a conduit, a plate having an opening at the center thereof for the flow of fluid therethrough, said plate having a plurality of spaced impact pressure passages radially extending from the center of the plate toward the periphery thereof, said plate having impact pressure ports at one side of the plate forming a plurality of series thereof circumferentially disposed about the center of the plate at different radii from the center of the plate, each impact pressure port communicating with an impact pressure passage, said plate having a plurality of spaced static pressure passages extending toward the center of the plate from the periphery thereof, said plate having static pressure ports at the other side of the plate forming a plurality of series thereof circumferentially disposed about the center of the plate, at the same radii from the center of the plate as the plurality of impact pressure ports, respectively, each static pressure port communicating with a static pressure passage, said plate adjacent the periphery thereof having an annular impact pressure channel communicating with the impact pressure passages and for connection to one side of a metering mechanism, said plate adjacent the periphery thereof having an annular static pressure channel communicating with the static pressure passages and for connection to the other side of the said metering mechanism, said impact pressure ports and said static pressure ports opening on opposite sides of said plate, respectively.

3. In a fluid flow orifice structure to be interposed in the flow area of a conduit across the cross section thereof, a body, said body having an open center and a plurality of radial impact pressure passages located in one plane, and a plurality of radial static pressure passages located in a second plane parallel to and spaced from the first plane, said body having a series of impact pressure ports communicating with the impact pressure passages and extending to the impact side of said body, and a series of static pressure ports communicating with said static pressure passages and extending to the static side of said body, said impact pressure ports being arranged in radial series of ports, each radial series of impact pressure ports corresponding to an impact pressure passage, said impact pressure ports forming series thereof circumferentially disposed about the open center at different radii therefrom, said static pressure ports corresponding in number to the impact pressure ports and arranged in radial series of ports, each radial series of static pressure ports corresponding to a static pressure passage, said static pressure ports forming series thereof circumferentially disposed about the open center at different radii therefrom, said body being formed with an annular impact pressure channel communicating with said impact pressure passages for connection to one side of a metering apparatus, and said body also being formed with an annular static pressure channel communicating with said static pressure passages for connection to the other side of the metering apparatus.

4. The combination of claim 1, in combination with a contracting throat ring positioned against one face of said plate, and a second ring having an expanding throat positioned against the other face of said plate.

5. The combination of claim 4, said first and second rings being removably positioned against the faces of the plate.

6. The combination of claim 4, said first ring having a number of passages communicating with corresponding impact pressure ports, and said second ring having a number of passages communicating with corresponding static pressure ports.

7. A fluid flow orifice structure of claim 1, said plate being formed with radial cutouts communicating with the central opening to form spaced radial members extending toward the central opening, each member having a plurality of said spaced impact pressure ports on one face of the plate and also having correspondingly spaced static pressure ports on the other face of said plate, one of said radial impact pressure passages extending through each member toward the periphery of the plate and communicating with the impact pressure ports in said member, one of said radial static pressure passages extending through each member toward the periphery of the plate and communicating with the static pressure ports in said member.

8. In a fluid flow orifice structure of claim 1, wherein some of said impact pressure ports and said static pressure ports are located in the plate at a distance from the center thereof equal to seventy-one hundredths of the radius of the conduit and other of said impact pressure ports and static pressure ports are located in the plate at a distance equal to seventy-five one hundredths of the radius of the conduit.

9. The fluid flow orifice structure of claim 8, said plate being cut away at the center thereof to form members extending toward the open center, said impact pressure ports formed in said members on one side thereof and said static pressure ports formed in said members on the other side thereof.

JAMES H. CARBONE.

REFERENCES CITED

The following references are of record in the file of this patent:

UNITED STATES PATENTS

| Number | Name | Date |
|---|---|---|
| 1,250,238 | Spitzglass | Dec. 18, 1917 |
| 2,260,019 | Gentile | Oct. 21, 1941 |

FOREIGN PATENTS

| Number | Country | Date |
|---|---|---|
| 28,593 | Great Britain | of 1896 |
| 222,896 | Germany | June 8, 1909 |
| 232,867 | Germany | Mar. 24, 1911 |